United States Patent
Singh

(10) Patent No.: US 11,625,243 B2
(45) Date of Patent: *Apr. 11, 2023

(54) MICRO-APPLICATION CREATION AND EXECUTION

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,455

(22) Filed: Apr. 26, 2022

(65) Prior Publication Data
US 2022/0261244 A1 Aug. 18, 2022

Related U.S. Application Data

(63) Continuation of application No. 16/861,447, filed on Apr. 29, 2020.

(51) Int. Cl.
*G06F 9/22* (2006.01)
*G06F 9/451* (2018.01)
*G06F 3/0482* (2013.01)

(52) U.S. Cl.
CPC .......... *G06F 9/226* (2013.01); *G06F 3/0482* (2013.01); *G06F 9/451* (2018.02)

(58) Field of Classification Search
CPC ......... G06F 9/226; G06F 9/451; G06F 3/0482
See application file for complete search history.

(56) References Cited

U.S. PATENT DOCUMENTS

| | | | |
|---|---|---|---|
| 6,973,626 B1 * | 12/2005 | Lahti | G06F 9/451 715/744 |
| 6,976,210 B1 | 12/2005 | Silva et al. | |
| 8,104,044 B1 * | 1/2012 | Scofield | G06F 9/542 719/313 |
| 10,331,424 B1 | 6/2019 | Speller, III et al. | |
| 2006/0168536 A1 | 7/2006 | Portmann | |
| 2008/0307301 A1 * | 12/2008 | Decker | G06F 16/9577 715/241 |
| 2010/0071026 A1 | 3/2010 | Poulsen et al. | |

(Continued)

OTHER PUBLICATIONS

International Search Report and Written Opinion received in International Application No. PCT/US2021/026173 dated Jul. 16, 2021, 14 pages.

(Continued)

*Primary Examiner* — William L Bashore
*Assistant Examiner* — Gregory A Distefano

(57) ABSTRACT

A method for creating and executing a micro-application includes receiving a user selection of a user interface element within a user interface of a primary application. Source code associated with the selected user interface element is parsed to obtain at least one attribute associated with the selected user interface element. Data associated with the selected user interface element is identified based on the source code. A response based on the at least one attribute and the data is generated. A microapp configured to process the response to obtain the data from within the primary application is generated.

17 Claims, 10 Drawing Sheets

(56) References Cited

U.S. PATENT DOCUMENTS

2014/0122996 A1* 5/2014 Gupta .................... G06F 9/451
715/234
2017/0093652 A1 3/2017 Blasko et al.
2017/0289307 A1 10/2017 Thompson et al.

OTHER PUBLICATIONS

Francese Rita et al., "Management, Sharing and Reuse of Service-Based Mobile Applications", 2015 2nd ACM International Conference on Mobile Software Engineering and Systems, 2015 IEEE, 4 pages.
Ryan, "Jquery—Get selected element's outer HTML—Stack Overflow", Mar. 10, 2010. Retrieved from the Internet: URL: https://stackoverflow.com/questions/2419749/get-selected-elements-outer-html [retrieved Jul. 7, 2021].

* cited by examiner

MICRO-APPLICATION CREATION AND EXECUTION

CROSS-REFERENCE TO RELATED APPLICATION

This application claims benefit under 35 U.S.C. § 120 as a continuation of U.S. patent application Ser. No. 16/861,447, entitled "MICRO-APPLICATION CREATION AND EXECUTION" and filed on Apr. 29, 2020, which is hereby incorporated herein by reference in its entirety.

BACKGROUND

In computing environments, micro-applications, or microapps, are small, task-specific applications that deliver highly targeted functionality within the context of another application. For example, microapps allow users to accomplish single-purpose activities in a simple and quick manner across a range of applications. Microapps can also deliver actionable forms, notifications, and workflows to users on behalf of other applications. This can save time by reducing context switching between applications and eliminating the need for users to learn application-specific actions for one-off interactions (such as single sign-on or SSO authentication). While microapps provide front-facing ease of use, they must initially be configured for and integrated into supporting applications, which can be a complex and time-consuming task requiring a focused programming skill set.

SUMMARY

One example embodiment provides a method including receiving, by a computing device, a user selection of a user interface element within a user interface of a primary application; parsing, by the computing device, source code associated with the selected user interface element to obtain at least one attribute associated with the selected user interface element; identifying, by the computing device, data associated with the selected user interface element based on the source code; generating, by the computing device, a response based on the at least one attribute and the data; and generating, by the computing device, a microapp configured to process the response to obtain the data from within the primary application. In some cases, the method include determining, by the computing device, that the selected user interface element includes a grouping of user interface elements based on at least one of: a length or size of the selected user interface element; a table or list within the selected user interface element; and at least two user interface elements in the grouping of user interface elements having a common ancestor user interface element in the grouping of user interface elements. In some such cases, the at least one attribute is unique to a child user interface element in the grouping of user interface elements or unique to an ancestor user interface element in the grouping of user interface elements. In some cases, the method includes causing, by the computing device, the microapp to perform an operation including executing at least one hyperlink or action associated with the selected user interface element from within the primary application. In some such cases, the method includes causing, by the computing device, the microapp to display a result of the operation via the user interface of the primary application. In some other such cases, the microapp is configured to perform the operation periodically. In some cases, the response is a JavaScript Object Notation (JSON) response.

Another example embodiment provides a computer program product including one or more non-transitory machine-readable mediums having instructions encoded thereon that when executed by at least one processor cause a process to be carried out. The process includes receiving a user selection of a user interface element within a user interface of a primary application; parsing source code associated with the selected user interface element to obtain at least one attribute associated with the selected user interface element; identifying data associated with the selected user interface element based on the source code; generating a response based on the data; and generating a microapp configured to process the response to obtain the data from within the primary application. In some cases, the process includes determining that the selected user interface element includes a grouping of user interface elements based on at least one of: a length or size of the selected user interface element; a table or list within the selected user interface element; and at least two user interface elements in the grouping of user interface elements having a common ancestor user interface element in the grouping of user interface elements. In some such cases, the at least one attribute is unique to a child user interface element in the grouping of user interface elements or unique to an ancestor user interface element in the grouping of user interface elements. In some cases, the process includes causing the microapp to perform an operation including executing at least one hyperlink or action associated with the selected user interface element from within the primary application. In some cases, the process includes causing the microapp to display a result of the operation via the user interface of the primary application. In some cases, the microapp is configured to perform the operation periodically.

Yet another example embodiment provides system including a storage and at least one processor operatively coupled to the storage, the at least one processor configured to execute instructions stored in the storage that when executed cause the at least one processor to carry out a process. The process includes receiving a user selection of a user interface element within a user interface of a primary application; parsing source code associated with the selected user interface element to obtain at least one attribute associated with the selected user interface element; identifying data associated with the selected user interface element based on the source code; generating a response based on the at least one attribute and the data; and generating a microapp configured to process the response to obtain the data from within the primary application. In some cases, the process includes determining that the selected user interface element includes a grouping of user interface elements based on at least one of: a length or size of the selected user interface element; a table or list within the selected user interface element; and at least two user interface elements in the grouping of user interface elements having a common ancestor user interface element in the grouping of user interface elements. In some such cases, the at least one attribute is unique to a child user interface element in the grouping of user interface elements or unique to an ancestor user interface element in the grouping of user interface elements. In some cases, the process includes causing the microapp to perform an operation including executing at least one hyperlink or action associated with the selected user interface element from within the primary application. In some such cases, the process includes causing the microapp to display a result of the operation via the user interface of the primary application. In some other such cases, the microapp is configured to perform the operation periodically. In some cases, the response is a JavaScript Object Notation (JSON) response.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

General Overview

Figure 1:
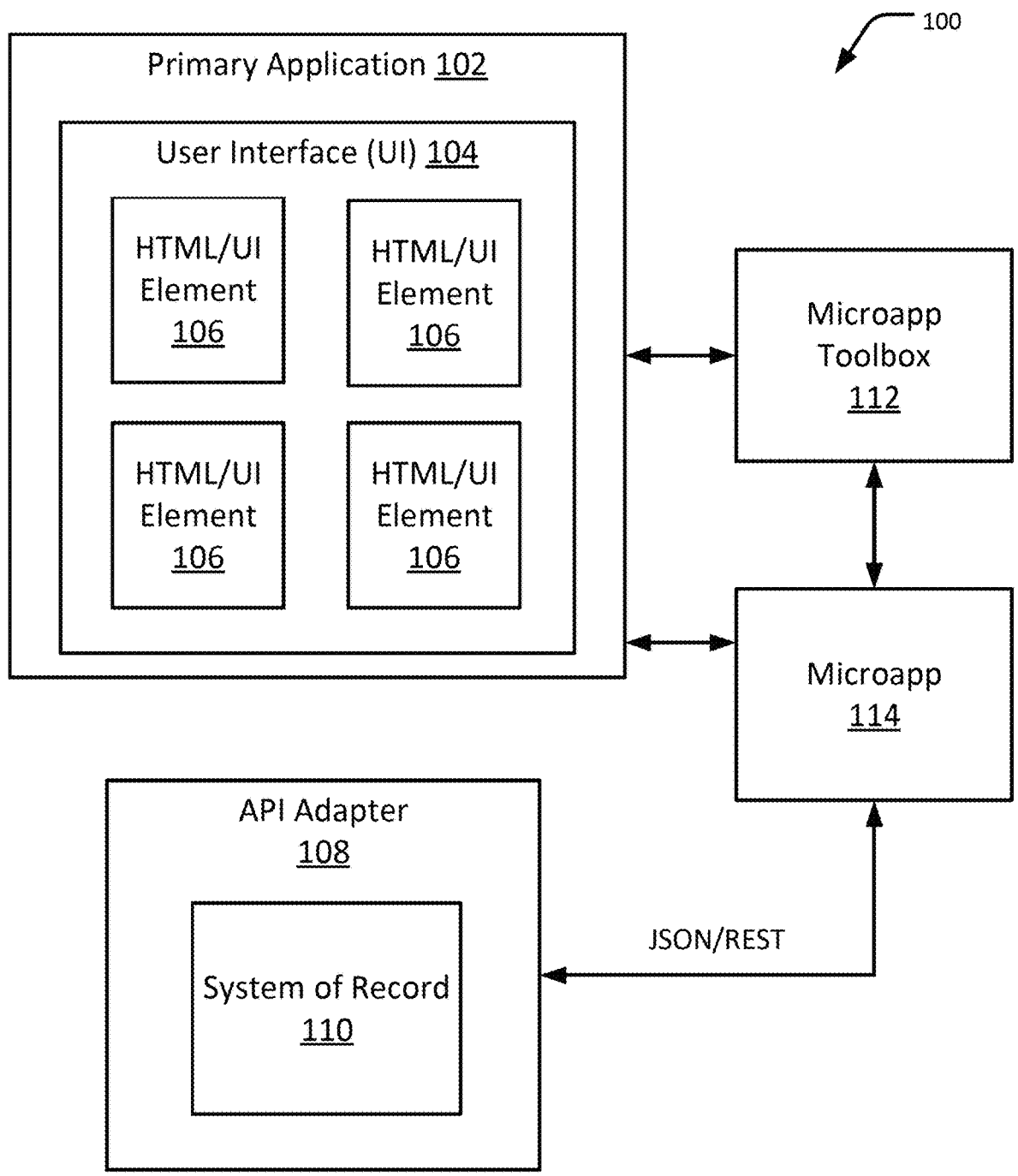
FIG. 1 is an example processing environment including one or more microapps, in accordance with an embodiment of the present disclosure.

As noted above, microapps provide powerful functionality that allows users to accomplish single-purpose activities in a simple and quick manner across a range of applications. To implement a microapp that leverages code within a host application, the host application must provide an application programming interface (API) through with the microapp interacts with the host application. Examples of such APIs include RESTful (Representational State Transfer) APIs and JavaScript Object Notation (JSON) APIs. However, particularly with legacy applications, APIs for microapps may not exist or only be partially exposed by the host application, and the cost and time associated with creating suitable APIs for implementing microapps is relatively high. Furthermore, even when an API exists, it may not support all functionality needed by the microapp. In these cases, administrators may need to develop suitable APIs for each microapp they wish to implement. However, often these administrators lack the technical development skills for developing microapp APIs. An alternative solution is to hire consultants or developers specifically tasked to develop the microapp APIs, but again development costs and time are generally high. In addition to providing suitable microapp APIs, the microapps themselves must be developed.

Microapp development can be complex, for example, requiring hundreds of steps to be performed in a specific order to suit the user's needs. For example, User A may wish to have a microapp that provides notification of certain types of news, but User B may not want to receive the same notifications. Therefore, the microapps must be configured differently for Users A and B. Unfortunately, end users do not usually possess the skills or time need to develop microapps themselves according to their own preferences. In some instances, microapps running on local systems are configured to interact with a server-side architecture that must support the microapp APIs. This typically means that server vendors must provide service accounts in support of these microapps, which further limits the ability to customize the microapps for individual users. Additionally, such server-side configurations consume large amounts of data over the network and in local caches each time the microapp synchronizes with the server.

To this end, techniques are provided for microapp creation and execution, including within legacy applications that do not have extant microapp APIs using, for example, REST/JSON APIs. The techniques include creating a microapp from within an HTML structure of a web page or the user interface (UI) of a legacy application, scraping data from the web page or UI, recommending relevant client-side content and actions based on the HTML/UI structure and data, and generating and configuring an API adapter for execution of the microapp. These techniques can be implemented, for example, as web browser plug-ins or extensions, or tools separately launched from within a workspace application.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

General Terminology

As used herein, the term "microapp" refers, in addition to its ordinary meaning, to a lightweight software application configured to provide a user with simplified access to specific functionality and/or data that is provided by one or more underlying applications. For example, microapps allow a user to view information and perform actions without launching or switching context to an underlying application. Microapps can be characterized as being "event driven" or "user initiated." Event driven microapps are invoked in response to detecting a certain event or condition, and can be configured to generate user notifications when something requires attention. For example, an event driven microapp might display a budget report in response to receiving an expense approval request or display a syllabus in response to the opening of a course registration period. User initiated microapps, on the other hand, are invoked in response to a user action, and act as a shortcut to frequently performed actions, such as approving expense reports, confirming calendar appointments, submitting helpdesk tickets, and reviewing vacation requests. Microapps streamline workflows by reducing context switching and eliminating the need to learn how to use complex applications.

Process Overview

A digital workspace is a software framework for delivering and managing applications, data, and desktops in a consistent and secure manner across multiple devices and locations. The digital workspace enhances the user experience by streamlining and automating frequently performed tasks, such as browsing web pages, entering data into forms, and retrieving data into applications. The digital workspace allows users to access functionality provided by multiple applications through a common user interface (UI), including software-as-a-service (SaaS) applications, web applications, desktop applications, enterprise applications, and proprietary applications. Microapps extend the capabilities of these applications in the digital workspace. The microapp can be configured to perform certain functions that assist the user, such as notifying users when data from a system of record (SoR) is added, changed or otherwise updated. The microapp allows a list of available actions to be curated and presented to a user, thereby allowing the user to interact with an entire suite of diverse applications without leaving the digital workspace interface.

The wide-ranging productivity and usability benefits of microapps has resulted in a need for tools that make it easy for developers and other end-users to create individually customized microapps. Such development tools streamline the process of identifying frequently invoked actions from applications within the digital workspace and integrating those actions into the customized microapp. For example, while prebuilt microapp action templates can be directly integrated into a user's digital workspace, such microapps may not adequately serve the unique needs of a given user or group of users.

Existing microapp development tools help administrators to develop and deploy a suite of microapps that is tailored to the needs of a particular user or a group of users. This development process remains heavily reliant on human knowledge and intuition to identify the workflows that microapps should facilitate. For example, to create useful microapp integrations, developers should know which applications are frequently used, and more specifically, what application functionality is frequently invoked by specific users. However, in a large organization it is difficult for administrators to customize the workspace for this individualized usage, thus presenting an obstacle to the development of useful microapps.

In a more general sense, the functionality provided by a microapp and the underlying applications that a microapp leverages are often selected based on the subjective judgment of a developer, administrator, or other software engineer. It is often challenging for software engineers to make judgments with respect to which microapp functionality will most likely yield benefits in terms of improved efficiency and streamlined workflows. More specifically, software engineers charged with developing a digital workspace and the microapp functionality provided therein are often not aware of the application functionality that users in other fields see as most useful. For example, users in the financial services or healthcare industries will likely demand different functionality than software engineers or product managers. Furthermore, constructing microapps requires a high degree of programming skills and effort, so it is not practical for developers to customize microapps for many unique users. An improved approach would allow individual users to customize microapps to suit their needs and make the develop process less reliant on software developers and engineers.

In view of the foregoing, a microapp toolbox, as disclosed herein, allows administrators and users to easily customize, generate, and deploy new user-specific microapps for legacy, proprietary, or other specialized SaaS applications with less specialized skill and effort as compared to existing microapp development techniques.

FIG. 1 is an example processing environment 100 including one or more microapps, in accordance with an embodiment of the present disclosure. At least a portion of the processing environment 100 can be implemented within a digital workspace. Within the processing environment 100 is a primary application 102, which is configured to interact with a system of record (SoR) 110. An example of the primary application 102 is the Citrix Workspace infrastructure. The primary application 102 is configured to provide at least one user interface (UI) 104, which in turn is configured to provide at least one Hypertext Markup Language (HTML) or other UI element 106. For example, the UI element 106 can be an element of a web page displayed via the primary application 102. The processing environment 100 further includes an application programming interface (API) adapter 108 that is configured to interact with the SoR 110, for example, to send data to and receive data from the SoR 110. As will be described in further detail below, the processing environment 100 includes a microapp toolbox 112 and a microapp 114 that is generated by the microapp toolbox 112. The microapp toolbox 112 and the microapp 114 are configured to interact with the primary application 102 and the SoR 110.

The SoR 110 is an information storage system that is an authoritative source of data. An example of a SoR 110 is a computer system that serves data used by websites or other applications for collecting and disseminating information with end users. For instance, a web site that provides news stories can display data served by a SoR to the UI 104 of the primary application 102, which executes on or is otherwise provided to a client computing device. The HTML/UI element(s) 106 of the UI 104 are generated based on the data served by the SoR 110.

The microapp 114 is an application configured to perform one or more discrete tasks, sometimes highly targeted to a specific user-interface function. In general, the microapp 114 provides extensible features to the primary application 102 such that the primary application 102 need not be configured to perform the same tasks as the microapp 114. In this manner, the microapp 114 can be developed independently of the primary application 102 and provide additional features and functionality to the primary application 102 without requiring modification of the primary application 102 or significant additional resources.

The microapp toolbox 112 is a specialized module used to generate and configure the microapp 114. The microapp toolbox 112 provides the ability to manually or automatically identify the UI elements 106 of the UI 104 and generate the microapp 114 based on the UI elements 106, for example, to perform actions when the data associated with the UI element 106 is changed or otherwise updated by the SoR 110 or when the user activates the microapp 114.

Figure 2:
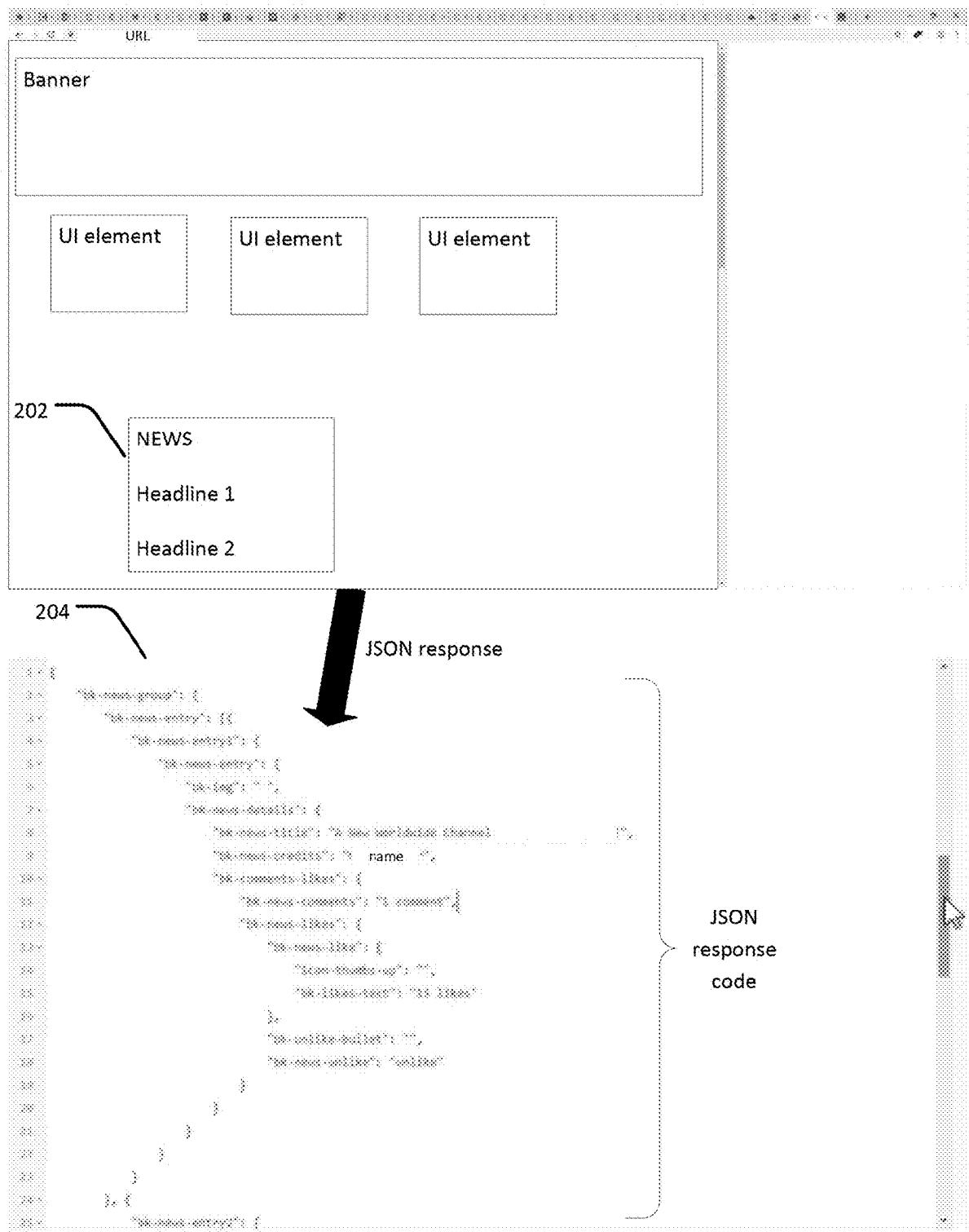
FIG. 2 shows an example UI element presented within the context of a web page, in accordance with an embodiment of the present disclosure.

Creating a Microapp from within a Web page or Software-as-a-Service (SaaS) User Interface FIG. 2 shows an example UI element 202 presented within the context of a web page. The UI element 202, for example, can be any HTML, element configured to display data to a user via the UI of the web page.

First, an administrator launches the primary application 102, such as a web browser, a SaaS application, or other application running on a local or virtual computing device. Next, the administrator launches the microapp toolbox 112, which provides, among other things, options to markup and select the UI elements 106 or display regions in the UI 104 of the primary application 102 for generating the microapp 114. The microapp toolbox 112 can be loaded from within the primary application 102 using, for example, a chrome extension page popup, a Chromium Embedded Framework (CEF), a Chromium Embedded Browser (CEB), a modified chromium (browser), an HDX Engine, and/or within a virtual session of the primary application 102.

The administrator activates a microapp analyzer mode in the microapp toolbox 112. This results in a) hooking of user navigation events within the primary application 102, such as selecting hyperlinks or entering uniform resource locators (URLs); b) hooking of UI click/mouse events within the application; and/or c) creation of a transparent canvas or an overlay on top of the UI 104 of the primary application 102 to show markup/selection of UI elements 106 in the primary application. For example, when the microapp analyzer mode is active, interacting with (for example, selecting) any UI element 106 in the primary application will not cause the UI element 106 to perform the corresponding (regular) action. Instead, UI interactions within the primary application are intercepted and monitored by the microapp toolbox 114 via the transparent canvas or overlay. In more detail, an event handler within the microapp toolbox 114 intercepts the UI interaction in the canvas or overlay and prevents the corresponding UI action from occurring while the microapp analyzer is active. When the administrator interacts with the UI elements 106 within the primary application 102 or navigates to a different URL, Document Object Model (DOM)/web/navigation/UI automation event hooks are used to record the administrator's interactions with the UI 104.

Manual UI Selection

When the administrator selects various UI elements 106 within the UI 104 of the primary application 102, the UI event hooks of the microapp toolbox 114 identify the underlying UI element 106 that is selected and uses UI automation attributes to identify the location of one or more sides of the selected UI element 106 (e.g., top, right, bottom, left), the width of the selected UI element 106, and/or the height of the UI element 106 within the UI 104. An indication, such as a rectangle (such as shown at 302 in FIG. 3A), is drawn by the microapp toolbox 114 on the canvas or overlay corresponding to the selected UI element 106. The selected UI element 106 is then added to a collection of microapp artifacts representing one or more UI elements 106 selected by the administrator. Conversely, clicking on a selected UI element 106 a second time deselects the element, erases the indication (e.g., the red rectangle) and removes the UI element 106 from the collection of microapp artifacts.

Microapp Configuration

The administrator causes the microapp toolbox 112 to generate the microapp 114 and/or a microapp API adapter 108 based on the selected UI elements 106 and the microapp artifacts. The API adapter 108 encapsulates the system of record and provides a REST interface that receives calls from the microapp 114 and returns responses formatted as JSON objects (also referred to herein as a JSON response) to the microapp 114. The microapp toolbox 112 analyzes each of the selected UI elements 106 (such as element 202 in FIG. 2) and collects details about the UI element 106, the appearance (look/feel) of the UI element 106, and other metadata associated with the UI element 106, which is stored as part of the microapp configuration as a JSON response 204 to selecting or activating the UI element 106, using the following procedure.

Figure 3A:
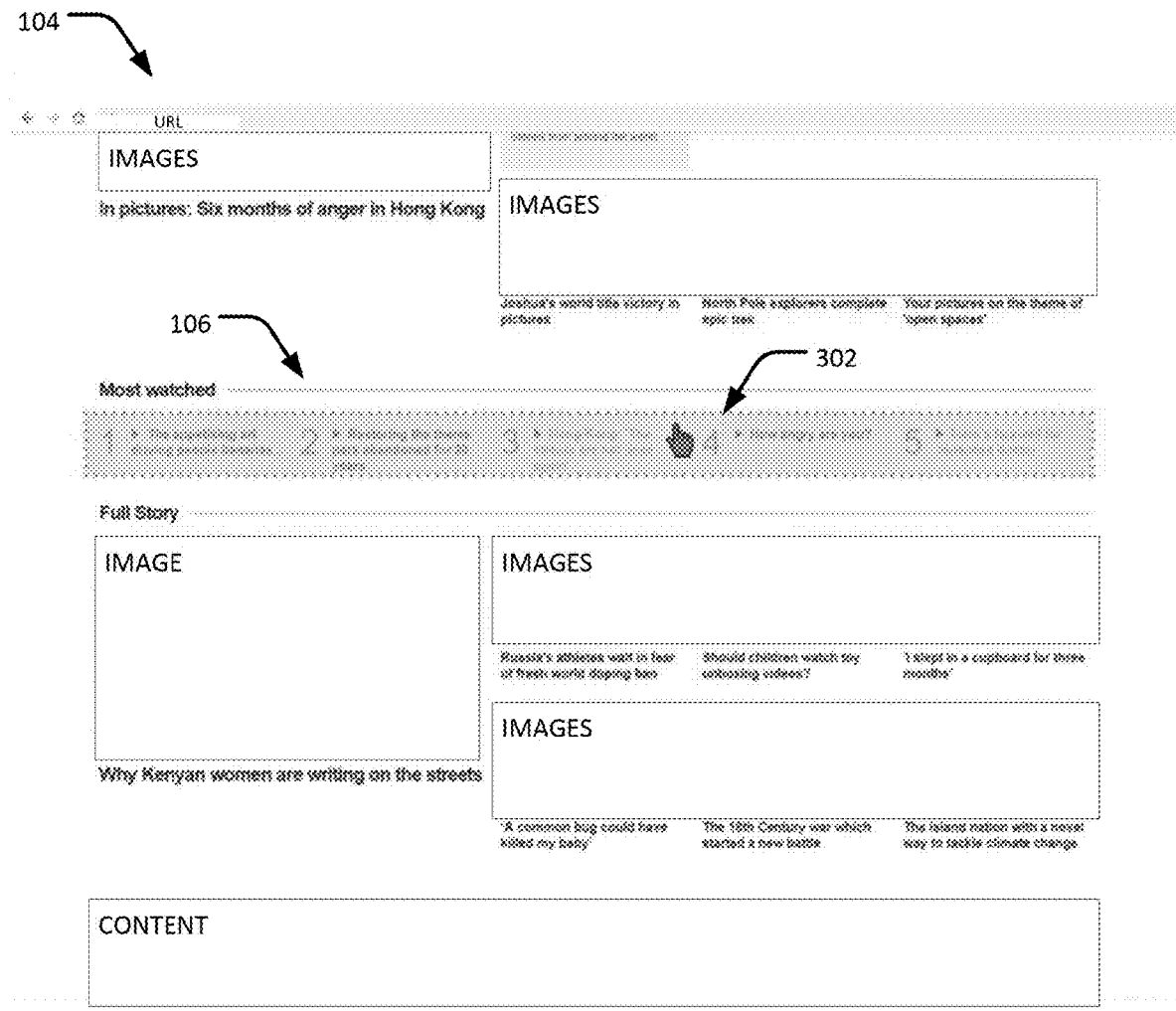
FIGS. 3A-B show an example UI in which a UI element is selected, in accordance with an embodiment of the present disclosure.
Figure 3B:
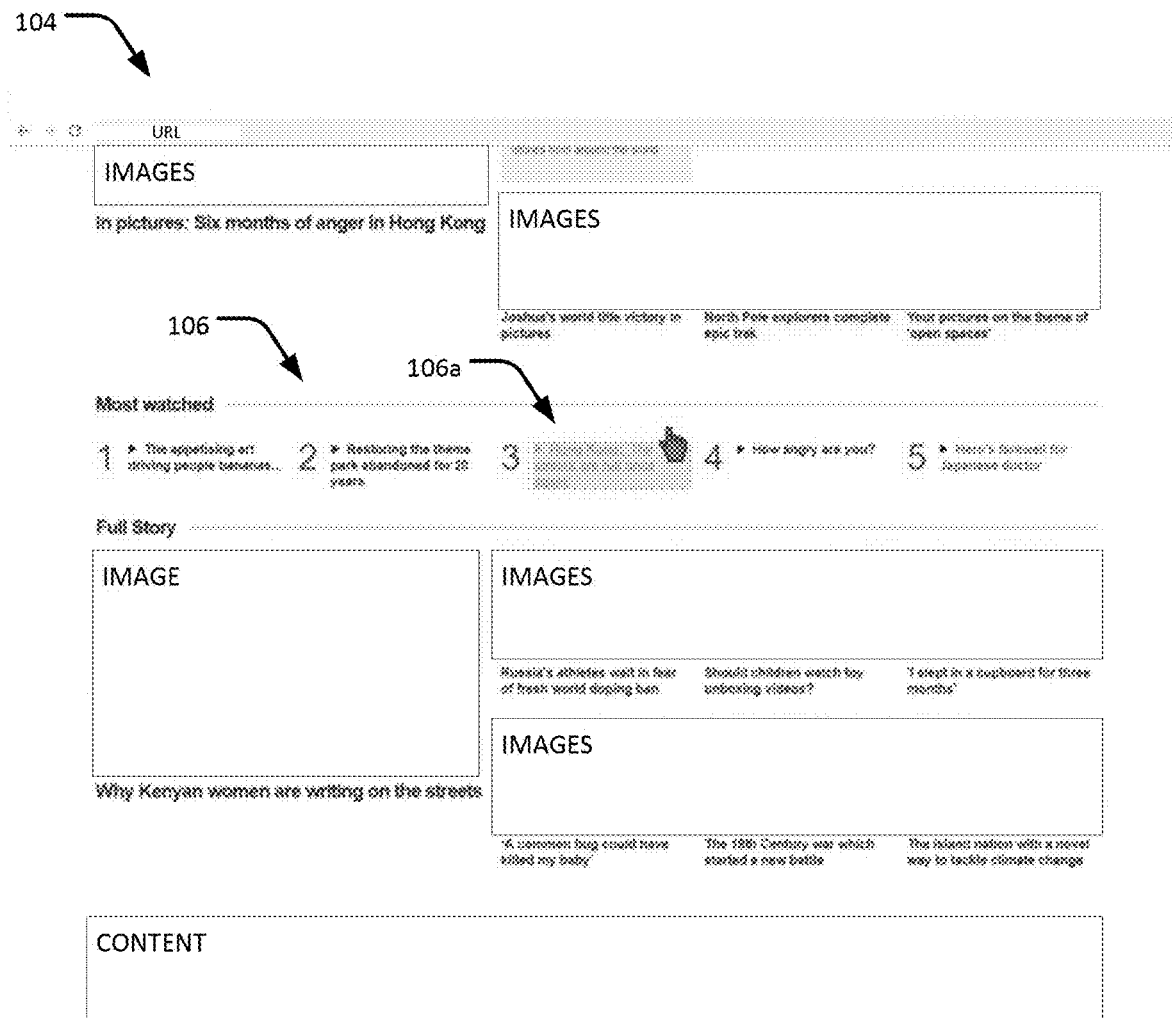

FIGS. 3A-B show an example UI 104 in which a UI element 106 is selected, in accordance with an embodiment of the present disclosure. First, the microapp toolbox 112 parses the DOM of the selected UI element(s) 106. For example, jQuery and HTML DOM parsing can be used to parse the XML or HTML source code of the selected UI element(s) 106 into a DOM object. The microapp toolbox 112 collects each selected UI element 106 and its corresponding id/className/classList and path attributes for further processing. In some cases, as shown in FIG. 3B, the administrator can select individual HTML/UI ancestor (e.g., grandparent, parent, or child) elements 106a within the selected UI element 106 or a group of HTML/UI ancestor and/or child elements (that is, a grouped HTML/UI element is one which has tables/lists and child elements inside it) based on: a) the length/size of the selected UI element(s) or group; b) one or more tables/lists within the selected UI element (e.g., <li>, <table>, etc. UI elements); and/or c) child elements having same className/classList as the selected UI element, which indicates a hierarchy with child elements having similar properties.

Next, the microapp toolbox 112 identifies the UI elements to be returned for generating a JSON/REST API. If the selected UI element(s) are individual elements, then the microapp toolbox 112 collects element attributes (e.g., id, class, path, etc.) of the DOM of the UI 104. If the selected UI element(s) are a group of elements, then the microapp toolbox 112 parses the DOM of the UI 104 to identify the unique className/classList of the child elements.

Next, the microapp toolbox 112 identifies the ancestor (e.g., parent and grandparent) UI element(s) (if any) of the selected UI element(s) 106. The ancestor UI elements are used to uniquely identify the associated child elements. If the ID of the ancestor UI element is unique, then the microapp toolbox 112 collects the ancestor UI element ID. If the ID of the ancestor UI element is not unique and if the className/classList attribute is unique within the primary application and/or web page, then the microapp toolbox 112 collects the className/classList attribute of the ancestor UI element. If the className/ClassList attribute is not unique, then the microapp toolbox 112 upwardly traverses the UI hierarchy to identify a UI element that has either a unique ID or a unique className/ClassList attribute. Next, the microapp toolbox 112 identifies a common ancestor element of the selected UI element(s). In some cases, the common ancestor element may have the same className/ClassList attribute used by one or more other UI elements within the primary application and/or web page. In this case, the microapp toolbox 112 identifies a different ancestor UI element (e.g., a grandparent) having a unique ID or className/List attribute or path. The grandparent element can be same as the parent element if the parent element ID or className/classList is unique. It will be understood that other variations and implementations can be used to establish the hierarchy of elements.

Next, the microapp toolbox 112 identifies data, hyperlinks and/or actions for each UI element in the parent/child hierarchy of the selected UI element 106. For each UI element in the hierarchy, the microapp toolbox 112 checks its child/parent element(s) for any links or other controls having an action role property (e.g., <a href= . . . >), which are collected in association with the corresponding child/parent UI element.

API Adapter Generation

After identifying the parent, grandparent, and child UI elements of the selected UI element 106, the microapp toolbox 112 generates API adapter code 204 (see FIG. 2) using, for example, nodeJS/powershell, or any other suitable coding language to produce an API adapter 108 (e.g., a REST API) for interfacing the microapp 114 with the SoR 110. The API adapter 108 is configured to transform a web page response, including any web page structure, content, and/or tables, into a JSON output including, for example, a JSON object having one or more child UI elements, links/actions, and the corresponding className/id attribute of the child UI elements of the web page response. The microapp toolbox 112 provides the API adapter 108 to infrastructure supporting the microapp 114. The microapp 114 interacts with the primary application 102 and the SoR 110 (via the API adapter 108) to retrieve and display data via the UI 104. For example, the API adapter 108 is configured to interface with exposed or "unexposed" endpoints of the SoR 110. Unexposed endpoints can be accessed by using a URL to send and fetch content from the SoR 110 for presenting the content via the UI 104. In some examples, the content can be fetched using screen scraping, automated UI calls, or POST and GET calls to the base URL address, or other suitable techniques for reading data from the SoR 110.

Figure 4A:
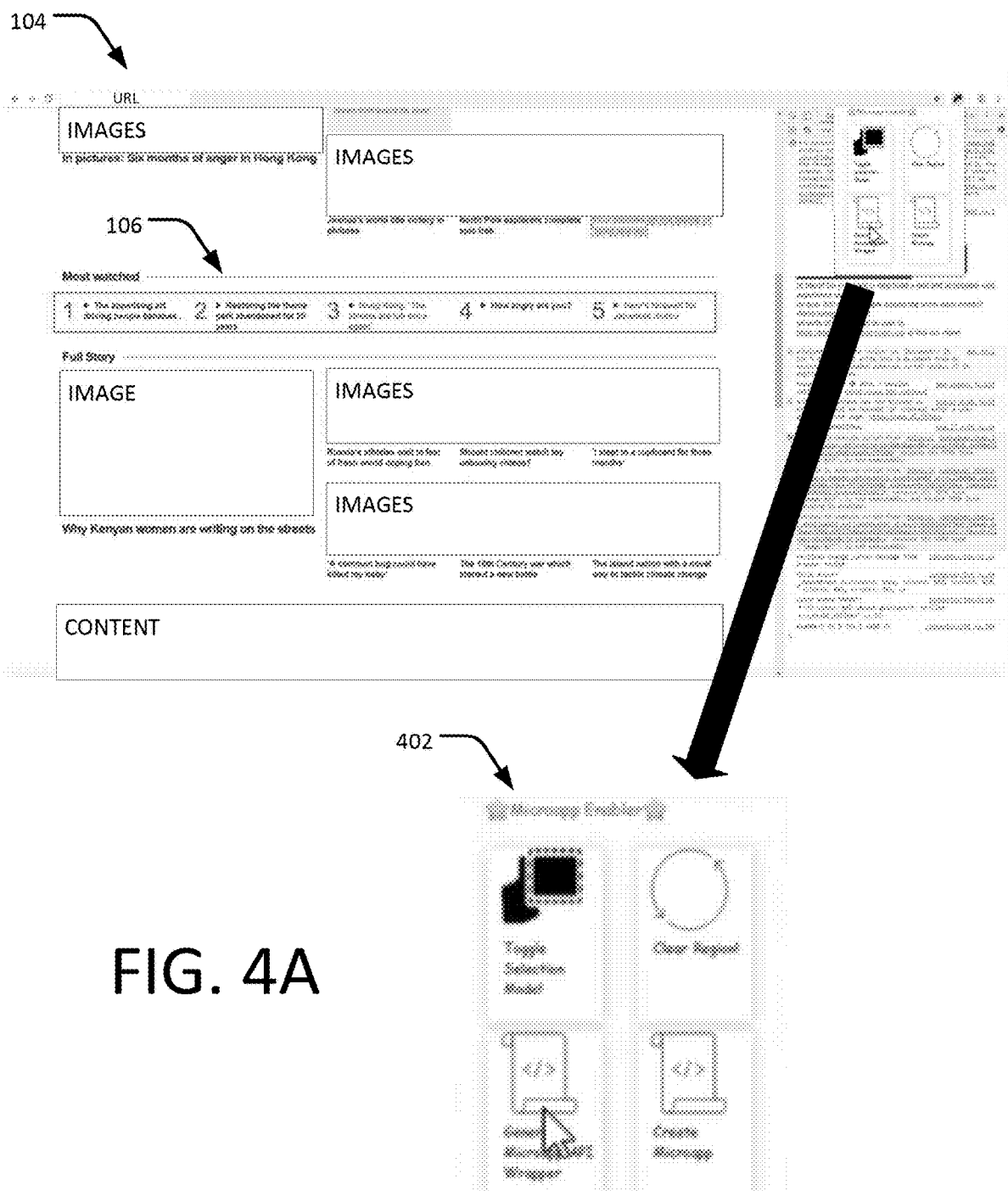
FIGS. 4A-B show the example UI of FIGS. 3A-B in which a JSON response is generated, in accordance with an embodiment of the present disclosure.
Figure 4B:
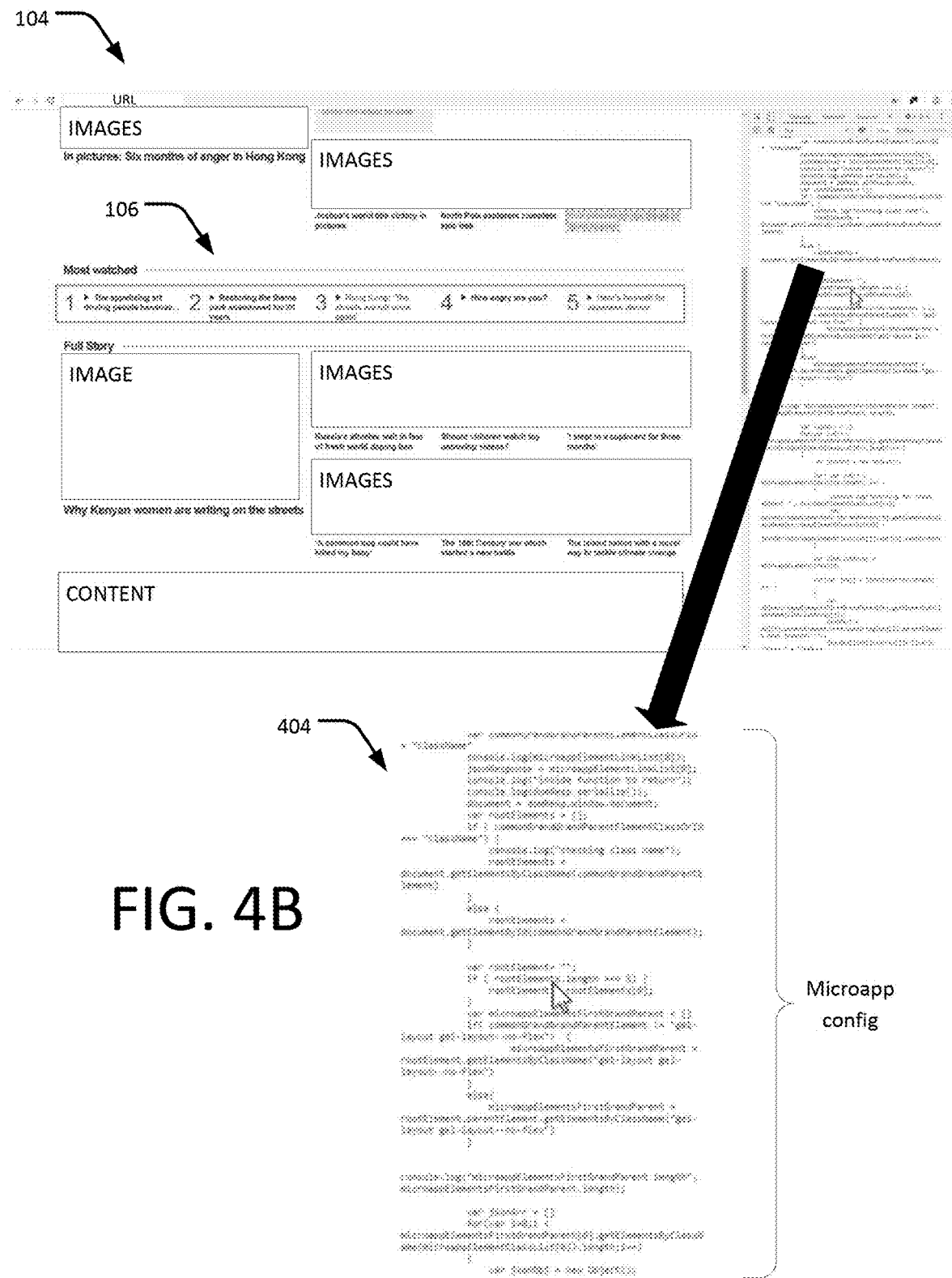

FIGS. 4A-B show the example UI 104 of FIGS. 3A-B in which a JSON response is generated in response to a user selection of one or more UI elements of a primary application, in accordance with an embodiment of the present disclosure. The UI 104 includes one or more UI elements 106, which represent the content fetched from the SoR. For example, the UI 104 can include text, graphics, images, audio players, or any other form of digital content. When configuring a microapp 114, the administrator selects one or more of the UI elements 106, such as described with respect to FIGS. 3A-B, using a user control palette 402 provided by the primary application 102. Once the administrator selects the UI element(s) 106 via the user control palette 402, the microapp toolbox 112 generates and sends the microapp configuration and/or code identified above (shown at 404 in FIG. 4B) to the primary application 102 to activate the corresponding UI elements 106 within the primary application 102. The microapp toolbox 112 uses REST API's exposed by the primary application 102 (or API's exposed by the microapp infrastructure services/system at the backend) to generate the microapp 114 and the API adapter 108, which provides an interface between the microapp 114, the primary application 102, and the SoR 110. Upon execution, the microapp toolbox 112 retrieves (fetches) content from the primary application 102 via the API adapter 108 as the JSON response 204.

Microapp Analyzer for Automatic Recommendation of a Microapp Configuration from within a Web/SaaS UI Initially, an administrator launches the primary application 102 and the microapp toolbox 112. The microapp toolbox 112 includes a microapp analyzer configured to automatically recommend a microapp configuration for generating the microapp 114. The microapp analyzer of the microapp toolbox 112 is configured to analyze the UI structure and other attributes of the primary application and to select one or more of the UI elements. Initially, the UI hierarchy and UI element roles/attributes are used to determine a type of microapp to be generated. For example, UI elements that are part of an HTML table, HTML grid, and/or HTML list, such as within a news section of a web page, are automatically selected as preliminary candidates for a microapp that generates user notifications when any UI element of the news section is updated with new data or otherwise changes. In another example, UI elements with form inputs are automatically selected as preliminary candidates for a microapp that performs one or more predefined actions, such as filling form fields with predefined or dynamically generated data. In yet another example, UI elements with inputs and an action role, such as buttons, checkboxes, selectors, and other widgets, are also considered candidates for a microapp that performs one or more predefined actions, such as selecting or otherwise activating the inputs based on predefined or dynamically generated conditions.

Next, annotations are created for each of the UI elements. An overlay, button, or HTML div element is created for each action associated with the UI elements identified by the microapp analyzer. For example, a "Create Microapp Notification" button or a "Create Microapp Action" button can be created for the corresponding actions. The administrator may manually edit the UI elements automatically selected by the microapp analyzer, for example, to deselect a UI element that was automatically selected or to select a UI element that was not automatically selected.

Next, the administrator causes the microapp analyzer to create a microapp 114 and/or an API adapter 108. In response, the microapp analyzer analyzes the selected UI element(s) and collects information, such as UI element details, look/feel, and other metadata configuration to be stored as part of the microapp configuration. For example, for a system of record 110 that provides data to an email application (e.g., the primary application 102), the API adapter 108 will expose REST calls that enable the primary application 102 to retrieve new mail form the SoR 110, which will be returned to the microapp 114 as a JSON object. It will be understood that other REST calls that are specific to the subject matter/functionality of the primary application 102 can be used, such as time entry, accounting, news, etc. The digital workspace application uses the microapp configuration to generate the microapp 114. The microapp 114 is configured to interface with the primary application 102 and the SoR 110 to generate and consume data using JSON/REST calls via the API adapter 108.

Microapp Notifications

Figure 5:
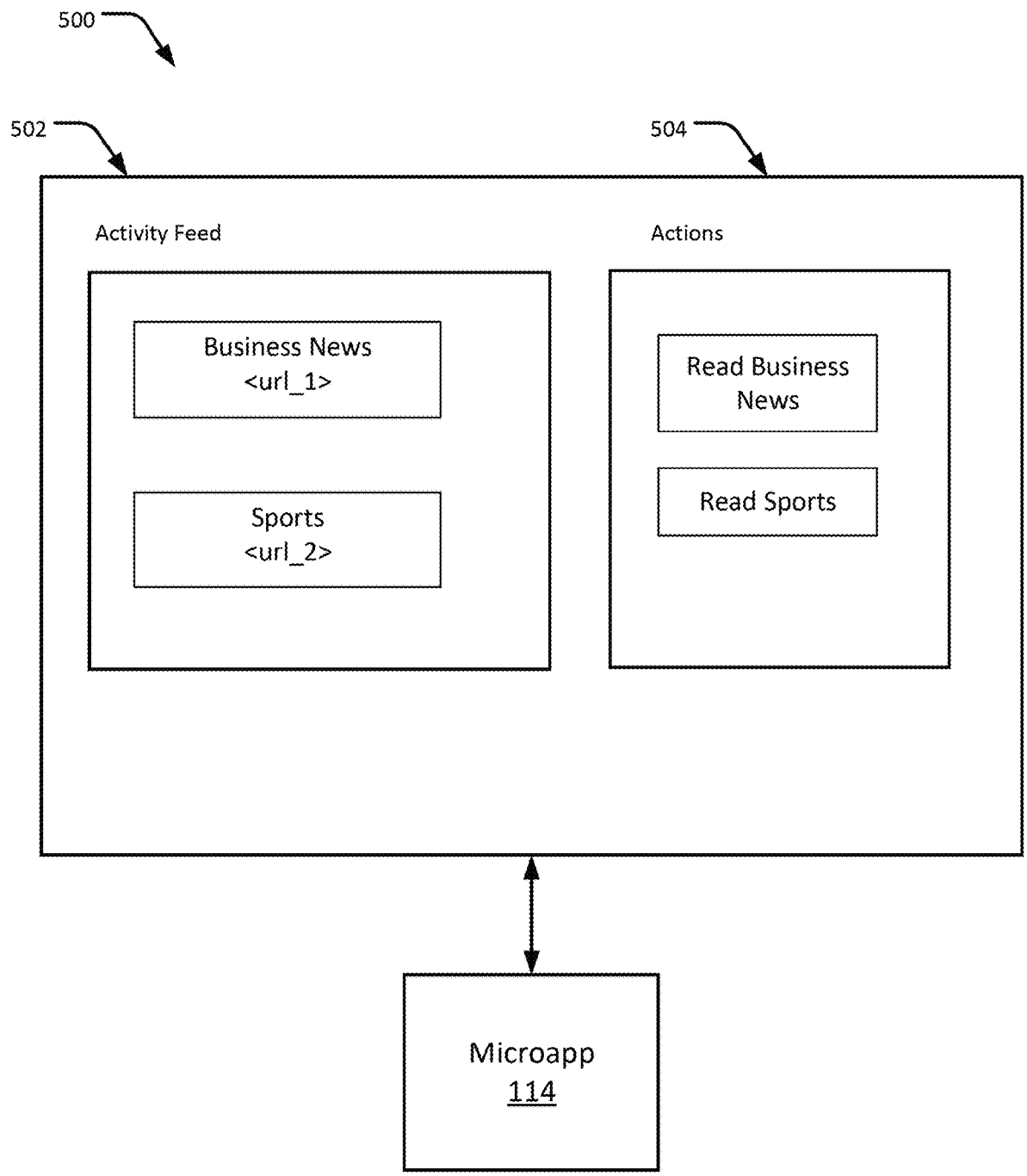
FIG. 5 shows an example microapp notification UI, in accordance with an embodiment of the present disclosure.

FIG. 5 shows an example microapp notification UI 500, in accordance with an embodiment of the present disclosure. When the administrator selects UI elements 106 as described above with reference to FIG. 1, the microapp 114 is configured to provide UI/web automation for navigating to the corresponding web page and launching the corresponding action (e.g., activating a hyperlink or entering data into a form field). For example, FIG. 5 shows an activity feed 502 and a set of actions 504 provided by the microapp 114. The activity feed 502 can include, for example, one or more URLs to web pages that correspond to the UI elements 106 that were selected during configuration of the microapp. In another example, the activity feed 502 can include data or portions of data scraped or obtained from the web page(s) that correspond to the UI elements 106 that were selected during configuration of the microapp. Selecting any of the URLs causes the microapp to automatically navigate to the corresponding web page and/or to obtain data corresponding to the web page and display the data and/or web page content. Similarly, the actions 504 are user-selectable buttons that when selected cause the microapp to automatically perform the corresponding action, such as navigating to the corresponding web page, activating a link, submitting a response, or displaying a user notification when data from the SoR is added, changed, or otherwise updated.

The microapp 114 can, in some embodiments, provide a timer for periodically updating notifications in the activity feed 502. For example, when the timer for the corresponding microapp notification expires, then a headless chrome session is started in the background. Single session sign-on (SSO) is used to authenticate the user within this headless chrome session. For actions 504, UI/web automation is used to navigate and trigger the action within the primary application 102. The microapp 114 receives an HTTP response from the primary application 102 and converts the HTTP response into JSON data (a JSON response). It will be understood that any suitable format can be used to represent the HTTP response, such as JSON or XML. A local cache of the JSON data is compared with the newly received JSON data to identify any new notification. The microapp notification is then displayed to the user in the microapp notification UI 500.

Microapp Actions on Client-Side

Proxy UI for client side microapp: When a user clicks on a microapp action 504, a proxy UI is shown to the user with only the UI part/elements 106 of the web page which the administrator selected, as described above (the other elements are effectively hidden). The dimensions of the proxy UI and the layout of the UI elements are based on the UI elements configuration stored as part of the microapp configuration metadata. In the background, the primary application 102 is launched using a headless chrome session in a hidden mode and a UI/web automation stored as part of the configuration is used to navigate and launch the microapp action 504. Any subsequent interaction with the proxy UI and/or data input is then transferred to the headless chrome session. The response from the headless chrome session is communicated back to the proxy UI or the primary application 102.

Action/Functionality UI within SaaS/web application: When a user clicks on microapp action 504, a proxy UI is shown to the user with only the UI part/elements which the administrator selected, as described above. The dimensions of the proxy UI and the layout of the UI elements are based on the UI elements configuration stored as part of the microapp configuration metadata. In the background, the primary application 102 is launched in a hidden mode and a UI/web automation stored as part of the configuration is used to navigate and launch the microapp action 504 within the primary application 102. When the page DOM is complete, the proxy UI is replaced with the actual web app UI. Any subsequent interaction with the proxy UI and/or data input is then performed directly in the web/SaaS app UI.

Example Methodology

Figure 6A:
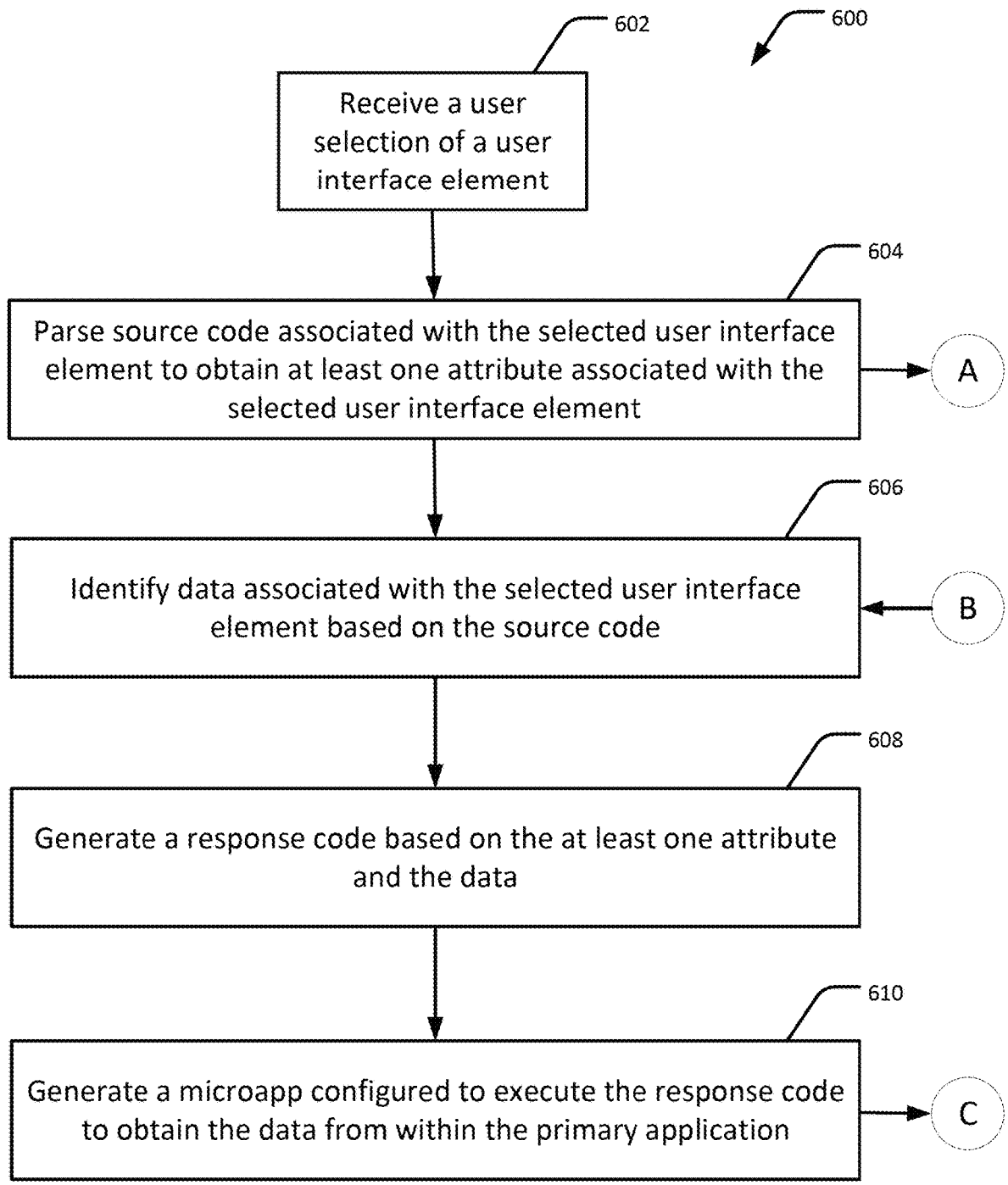
FIGS. 6A and 6B are flow diagrams of a method for generating and executing a microapp, in accordance with an embodiment of the present disclosure.
Figure 6B:
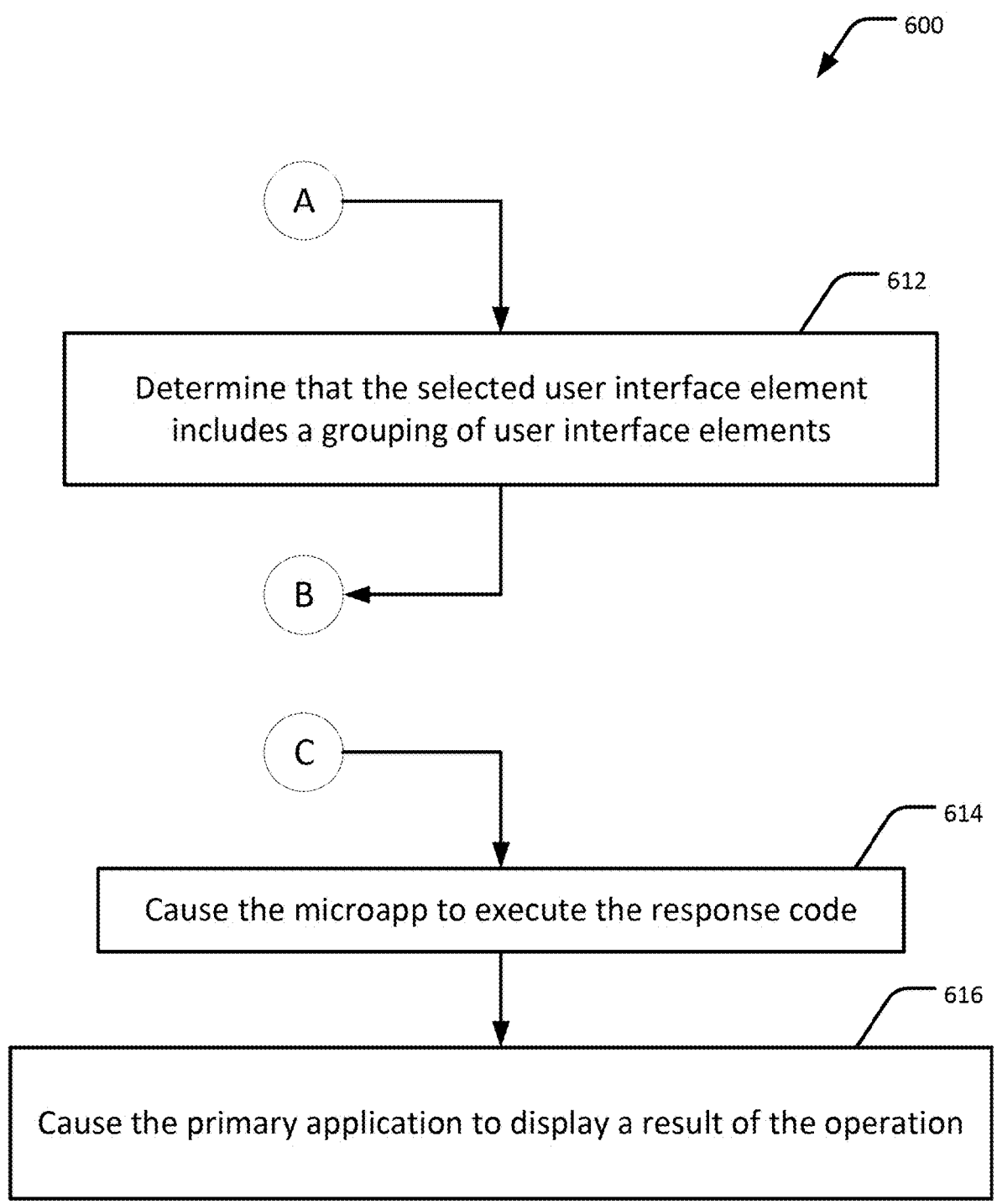

FIGS. 6A and 6B are flow diagrams of a method 600 for generating and executing a microapp, in accordance with an embodiment of the present disclosure. The method 600 includes receiving 602 a user selection of a user interface element within a user interface of a primary application, such as shown in FIGS. 3A-B. The selected user interface element can be an individual element or a group of elements. The method 600 further includes parsing 604 source code associated with the selected user interface element to obtain at least one attribute associated with the selected user interface element. The source code can include, for example, XML or HTML code used to generate the user interface element within the primary application (e.g., a browser). The method 600 further includes identifying 606 data associated with the selected user interface element based on the source code. For example, the selected user interface element can include a hyperlink to a web page, document, or other content data, or the selected user interface element can be configured to execute a script for performing an operation to obtain the content data.

The method 600 further includes generating 608 a response based on the at least one attribute and the data. In some embodiments, the response is a JavaScript Object Notation (JSON) output. In some embodiments, the response is an XML output. The JSON output represents information about the structure of the resource that presents the content (e.g., HTML, XML, links, data relationships, authors, attributes, etc.) in JSON format, which is a standard data interchange format often used for transmitting data between a web application and a server, although it will be understood that other formats (such as XML) can be used. The JSON output associated with the at least one hyperlink or action is generated by an API adapter, which allows the microapp to interact with the primary application and, in turn, the SoR, such as described with respect to FIG. 1. For example, the API adapter node/JavaScript output can be generated from the UI elements that the administrator or user selected to generate a microapp. The API adapter code generates the JSON output. To that end, the method 600 further includes generating 610 a microapp configured to execute the API adapter code to obtain the JSON output data from within the primary application, which in turn obtains the content from the SoR via the API adapter for presentation to the user.

In some embodiments, the microapp, once generated, can be edited and/or updated by the administrator or user via the infrastructure supporting the microapp. For example, the administrator/user can update the UI structure or data fields, such as by transforming or filtering certain data, or actions to be made visible in the microapp. In some cases, the administrator/user can also edit using the microapp toolbox, which can provide an edit option. Selecting this option within the toolbox shows the existing configured microapp on the given page elements 104, 106 to be highlighted or marked in a form. The administrator/user can edit the UI structure or data fields by selecting/unselecting them, such as during the initial configuration.

In some embodiments, the method 600 includes determining 612 that the selected user interface element includes a grouping of multiple user interface elements based on at least one of a length or size of the selected user interface element, a table or list within the selected user interface element, and at least two user interface elements in the grouping of user interface elements having a common parent user interface element in the grouping of user interface elements. For example, if the selected user interface element includes more than one distinct user interface element, each configured to have a different hyperlink or to perform a different action, then at least one attribute is unique to a child user interface element in the grouping of user interface elements or unique to a parent user interface element in the grouping of user interface elements. In one example, the grouping of user interface elements includes a parent element within a web page. The parent element has a link to content associated with the element, such as a "news" element can have a link, table, or other reference to multiple sub-elements "U.S. news," "world news," "local news,"

"sports," "business," "politics," "entertainment," and so on. Within any one of these sub-elements can be further sub-elements, such as "entertainment" having sub-elements "movies," "theater," "books," and so forth. Thus, the common parent user interface element "news" includes a grouping of all the associated sub-elements, which in turn have links to their respective content or further sub-elements. Thus, in some embodiments, at least some or all of the sub-elements, if any, are automatically selected when the parent element is selected.

In some embodiments, the method 600 includes causing 614 the microapp to execute the API adapter code to perform an operation including executing the at least one hyperlink or action from within the primary application, such as described with respect to FIG. 5. For example, the microapp can retrieve content from the SoR via the primary application by eliciting a JSON response via a call to the API adapter. Execution of the call to the API adapter causes the API adapter to interoperate with the SoR to retrieve content from the SoR. Instead of (or in addition to) displaying the content within an UI of a browser or SaaS application, the API adapter passes the data to the microapp. In some embodiments, the method 600 includes causing 616 the microapp to display a result of the operation via the user interface of the primary application or via a proxy UI that emulates at least a portion of the application UI. For example, the microapp can generate a proxy user interface based on the JSON output that replicates at least a portion of the user interface of the primary application for displaying the associated content independently of the application (e.g., in a separate display window or display frame). In some embodiments, the microapp is configured to execute the API adapter code periodically, such as once per minute or once per pre-determined amount of time interval, to determine whether the response from the primary application has been updated since the last interval, and to display the updated response (if any).

Example Computing Platform

Figure 7:
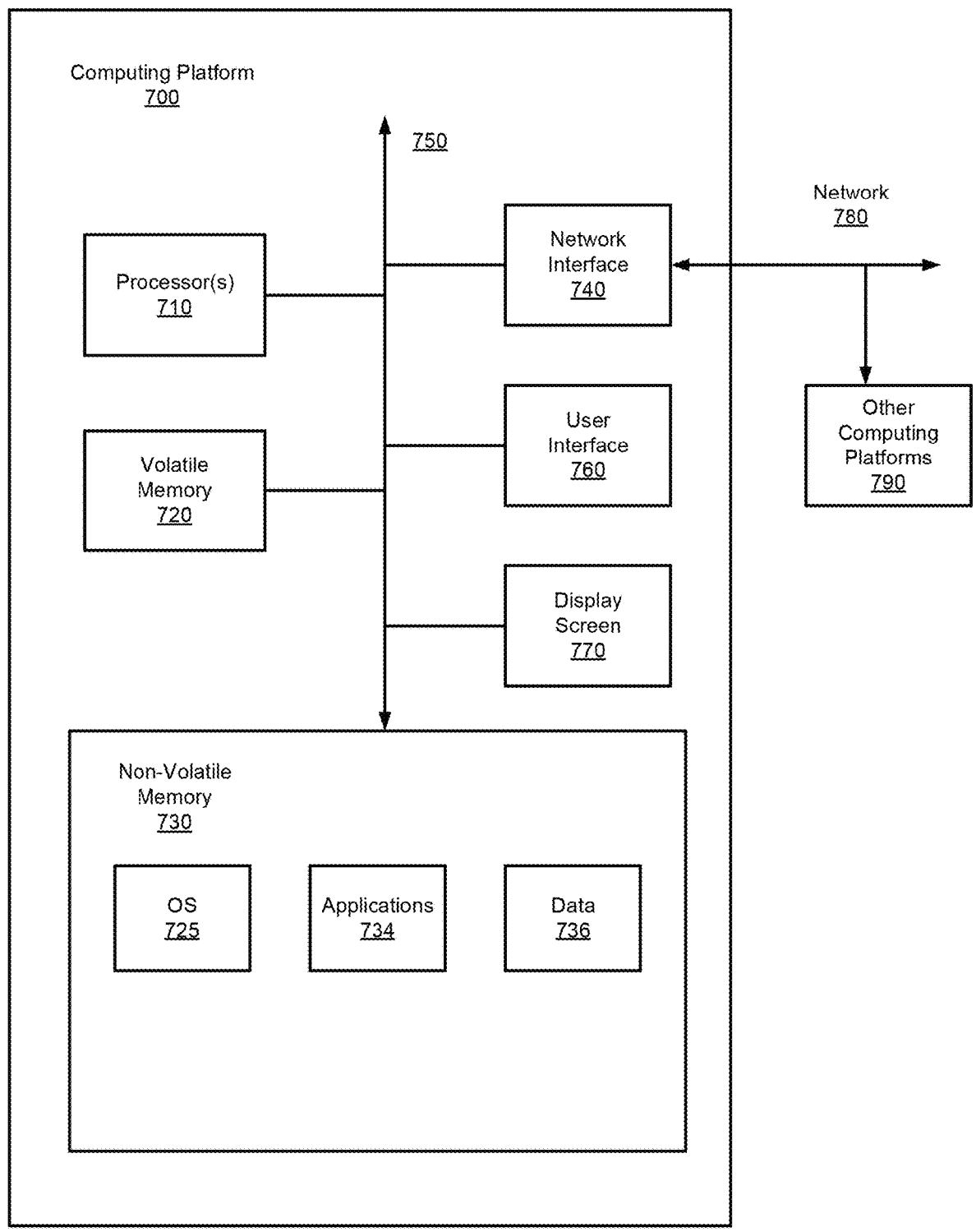
FIG. 7 is a block diagram of a computing platform, in accordance with an embodiment of the present disclosure.

FIG. 7 is a block diagram of a computing platform 700 configured to perform a microapp generating and execution process, in accordance with an example of the present disclosure. In some cases, the platform 700 may be a workstation, a laptop computer, a tablet, a mobile device, or any suitable computing or communication device.

The computing platform or device 700 includes one or more processors 710, volatile memory 720 (e.g., random access memory (RAM)), non-volatile memory 730, one or more network or communication interfaces 740, a user interface (UI) 760, a display screen 770, and a communications bus 750. The computing platform 700 may also be referred to as a computer or a computer system.

The non-volatile (non-transitory) memory 730 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 760 can include one or more input/output (I/O) devices (e.g., a mouse, a keyboard, a microphone, one or more speakers, one or more biometric scanners, one or more environmental sensors, and one or more accelerometers, etc.).

The display screen 770 can provide a graphical user interface (GUI) and in some cases, may be a touchscreen or any other suitable display device.

The non-volatile memory 730 stores an operating system ("OS") 725, one or more applications 734, and data 736 such that, for example, computer instructions of the operating system 725 and the applications 734, are executed by processor(s) 710 out of the volatile memory 720. In some examples, the volatile memory 720 can include one or more types of RAM and/or a cache memory that can offer a faster response time than a main memory. Data can be entered through the user interface 760. Various elements of the computer platform 700 can communicate via the communications bus 750.

The illustrated computing platform 700 is shown merely as an example computing device and can be implemented by any computing or processing environment with any type of machine or set of machines that can have suitable hardware and/or software capable of operating as described herein.

The processor(s) 710 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 710 can be analog, digital or mixed. In some examples, the processor 710 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 740 can include one or more interfaces to enable the computing platform 700 to access a computer network 780 such as a Local Area Network (LAN), a Wide Area Network (WAN), a Personal Area Network (PAN), or the Internet through a variety of wired and/or wireless connections, including cellular connections. In some examples, the network 780 may allow for communication with other computing platforms 790, to enable distributed computing. In some examples, the network 780 may allow for communication with the one or more of the primary application 102, the microapp toolbox 112, the microapp 114, and the SoR 110 of FIG. 1.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method comprising:
    selecting, by a computing device, a user interface element within a user interface of a primary application based on one or more attributes of the primary application;
    generating, by the computing device, an annotation for the selected user interface element;
    receiving, by the computing device, a user selection of the annotation;
    parsing, by the computing device and in response to receiving the user selection, source code associated with the selected user interface element to obtain at least one attribute associated with the selected user interface element;
    identifying, by the computing device, data from a system of record, the data associated with the selected user interface element based on the source code;
    converting, by the computing device, an HTTP response based on the at least one attribute and the data into a JavaScript Object Notation (JSON) output representing the at least one attribute and the data in a JSON format, the JSON output representing a microapp configuration; and
    generating, by the computing device, a microapp based on the microapp configuration;
    wherein the microapp is configured to:
        execute application programming interface (API) adapter code to transform the HTTP response into the JSON output,
        process the JSON output to obtain the data from the system of record independently of and from within the primary application, and
        present the data via the user interface of the primary application.

2. The method of claim 1, further comprising determining, by the computing device, that the selected user interface element includes a grouping of user interface elements based on at least one of:
    a length or size of the selected user interface element;
    a table or list within the selected user interface element; and
    at least two user interface elements in the grouping of user interface elements having a common ancestor user interface element in the grouping of user interface elements.

3. The method of claim 2, wherein the at least one attribute is unique to a child user interface element in the grouping of user interface elements or unique to an ancestor user interface element in the grouping of user interface elements.

4. The method of claim 1, further comprising causing, by the computing device, the microapp to perform an operation including executing at least one hyperlink or action associated with the selected user interface element from within the primary application.

5. The method of claim 4, further comprising causing, by the computing device, the microapp to display a result of the operation via the user interface of the primary application.

6. The method of claim 4, further comprising retrieving, by the computing device, the HTTP response from the primary application in response to execution of the at least one hyperlink or action by the microapp.

7. The method of claim 1, further comprising comparing the data in the JSON output to a local cache of data in the JSON format, and causing the microapp to display a notification via the user interface of the primary application based on the comparison.

8. A computer program product including one or more non-volatile memories having instructions encoded thereon that when executed by at least one processor cause a process to be carried out, the process comprising:
    selecting a user interface element within a user interface of a primary application based on one or more attributes of the primary application;
    generating an annotation for the selected user interface element;
    receiving a user selection of the annotation;
    parsing, in response to receiving the user selection, source code associated with the selected user interface element to obtain at least one attribute associated with the selected user interface element;
    identifying data from a system of record, the data associated with the selected user interface element based on the source code;
    converting an HTTP response based on the data into a JavaScript Object Notation (JSON) output representing the data in a JSON format, the JSON output representing a microapp configuration; and
    generating a microapp based on the microapp configuration;
    wherein the microapp is configured to:
        execute application programming interface (API) adapter code to transform the HTTP response into the JSON output,
        process the JSON output to obtain the data from the system of record independently of and from within the primary application, and
        present the data via the user interface of the primary application.

9. The computer program product of claim 8, wherein the process further comprises determining that the selected user interface element includes a grouping of user interface elements based on at least one of:
    a length or size of the selected user interface element;
    a table or list within the selected user interface element; and
    at least two user interface elements in the grouping of user interface elements having a common ancestor user interface element in the grouping of user interface elements.

10. The computer program product of claim 9, wherein the at least one attribute is unique to a child user interface element in the grouping of user interface elements or unique to an ancestor user interface element in the grouping of user interface elements.

11. The computer program product of claim 8, wherein the process further comprises causing the microapp to perform an operation including executing at least one hyperlink or action associated with the selected user interface element from within the primary application.

12. The computer program product of claim 11, wherein the process further comprises causing the microapp to display a result of the operation via the user interface of the primary application.

13. A system comprising:
a storage; and
at least one processor operatively coupled to the storage, the at least one processor configured to execute instructions stored in the storage that when executed cause the at least one processor to carry out a process including
selecting a user interface element within a user interface of a primary application based on one or more attributes of the primary application;
generating an annotation for the selected user interface element;
receiving a user selection of the annotation;
parsing, in response to receiving the user selection, source code associated with the selected user interface element to obtain at least one attribute associated with the selected user interface element;
identifying data from a system of record, the data associated with the selected user interface element based on the source code;
converting an HTTP response based on the at least one attribute and the data into a JavaScript Object Notation (JSON) output representing the at least one attribute and the data in a JSON format, the JSON output representing a microapp configuration; and
generating a microapp based on the microapp configuration;
wherein the microapp is configured to:
execute application programming interface (API) adapter code to transform the HTTP response into the JSON output,
process the JSON output to obtain the data from the system of record independently of and from within the primary application, and
present the data via the user interface of the primary application.

14. The system of claim 13, wherein the process further comprises determining that the selected user interface element includes a grouping of user interface elements based on at least one of:
a length or size of the selected user interface element;
a table or list within the selected user interface element; and
at least two user interface elements in the grouping of user interface elements having a common ancestor user interface element in the grouping of user interface elements.

15. The system of claim 14, wherein the at least one attribute is unique to a child user interface element in the grouping of user interface elements or unique to an ancestor user interface element in the grouping of user interface elements.

16. The system of claim 13, wherein the process further comprises causing the microapp to perform an operation including executing at least one hyperlink or action associated with the selected user interface element from within the primary application.

17. The system of claim 16, wherein the process further comprises causing the microapp to display a result of the operation via the user interface of the primary application.

* * * * *